US008459849B2

(12) United States Patent
Grimm et al.

(10) Patent No.: US 8,459,849 B2
(45) Date of Patent: Jun. 11, 2013

(54) OPTICAL DEVICE FOR A MOTOR VEHICLE

(75) Inventors: Martin Grimm, Obesursel (DE); Stephane Thery, Paris (FR); Alice Mulin, Noironte (FR); David Bourdin, Livry Gargan (FR); Jonathan Blandin, les Pavillons sous Bois (FR); Jean Masse, Franconville (FR)

(73) Assignee: Valeo Vision, Bobigny (FR)

( * ) Notice: Subject to any disclaimer, the term of this patent is extended or adjusted under 35 U.S.C. 154(b) by 237 days.

(21) Appl. No.: 12/766,191

(22) Filed: Apr. 23, 2010

(65) Prior Publication Data

US 2011/0002136 A1 Jan. 6, 2011

(30) Foreign Application Priority Data

Apr. 24, 2009 (FR) ..................................... 09 52684

(51) Int. Cl.
*B60Q 1/00* (2006.01)

(52) U.S. Cl.
USPC ............ 362/539; 362/538; 362/512; 362/282

(58) Field of Classification Search
USPC ................. 362/523, 538, 539, 512, 513, 277, 362/282, 284, 319, 322, 324, 449
See application file for complete search history.

(56) References Cited

U.S. PATENT DOCUMENTS

| | | | | |
|---|---|---|---|---|
| 5,339,226 | A * | 8/1994 | Ishikawa | 362/539 |
| 5,373,424 | A | 12/1994 | Ishikawa | |
| 5,379,196 | A * | 1/1995 | Kobayashi et al. | 362/466 |
| 6,623,149 | B2 | 9/2003 | Leleve | |
| 7,090,385 | B2 * | 8/2006 | Sugimoto | 362/539 |
| 7,201,505 | B2 * | 4/2007 | Sugimoto et al. | 362/539 |
| 7,347,602 | B2 * | 3/2008 | Fleury et al. | 362/539 |
| 7,736,037 | B2 * | 6/2010 | Losak et al. | 362/539 |
| 7,901,121 | B2 * | 3/2011 | Ohshio et al. | 362/512 |
| 2002/0044451 | A1 | 4/2002 | Leleve | |
| 2005/0024889 | A1 * | 2/2005 | Sugimoto | 362/539 |
| 2005/0201117 | A1 | 9/2005 | Sugimoto | |
| 2007/0217194 | A1 * | 9/2007 | Lee | 362/253 |
| 2009/0116259 | A1 | 5/2009 | Ohshio et al. | |

FOREIGN PATENT DOCUMENTS

| | | | |
|---|---|---|---|
| EP | 1197387 | A1 | 4/2002 |
| EP | 1422471 | A2 | 5/2004 |
| EP | 1422472 | A2 | 5/2004 |
| EP | 1806531 | A1 | 7/2007 |
| EP | 2006605 | A1 | 12/2008 |
| FR | 2754039 | A1 | 4/1998 |
| WO | 2009039882 | | 4/2009 |

* cited by examiner

*Primary Examiner* — Bao Q Truong
(74) *Attorney, Agent, or Firm* — Jacox, Meckstroth & Jenkins

(57) ABSTRACT

An optical device having an optical axis (y-y) and comprising
- a source of light;
- a reflector which is associated with the source of light in order to form a light beam;
- and a rotary assembly which is designed to intercept the light beam, and can be rotated around an axis of rotation between first and second distinctive lighting positions. The rotary assembly comprises at least first and second shields associated respectively with the first and second lighting positions, in order to create a cut-off of the light beam. The first and second shields each comprise at least one ridge. The rotary assembly additionally is designed to permit progressive transition of the lighting between the first and second distinctive lighting positions.

25 Claims, 10 Drawing Sheets

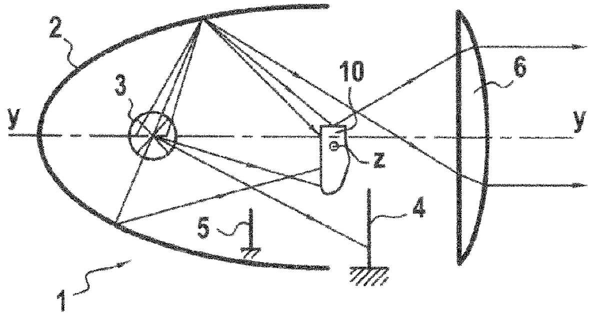
FIG.1
FIG.25
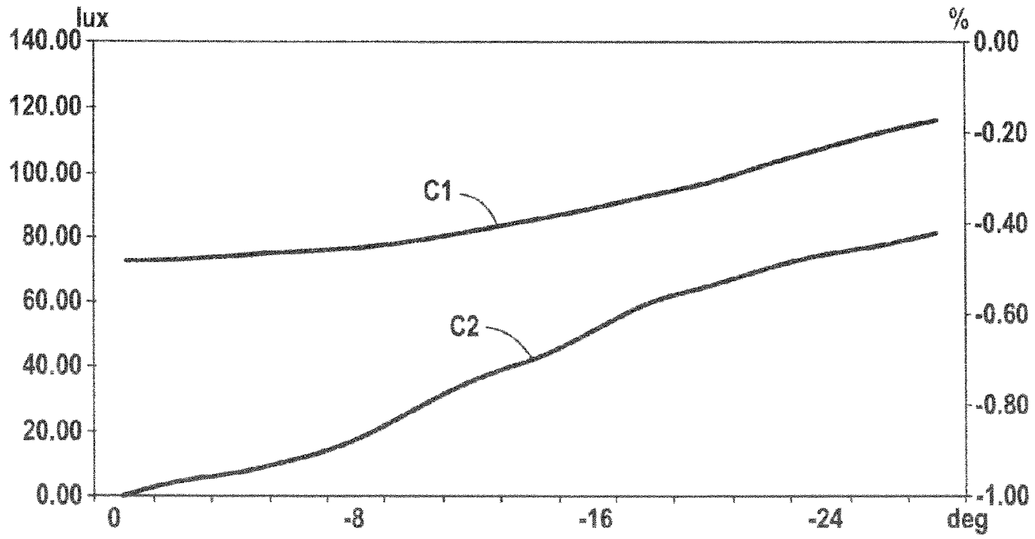

OPTICAL DEVICE FOR A MOTOR VEHICLE

CROSS-REFERENCE TO RELATED APPLICATIONS

This application claims priority to French Application No. 0952684 filed Apr. 24, 2009, which application is incorporated herein by reference and made a part hereof.

BACKGROUND OF THE INVENTION

1. Field of the Invention

The invention relates in particular to an optical device for a motor vehicle.

2. Description of the Related Art

A device is known from U.S. Patent Publication 2007/0217194, which comprises a rotary shield assembly which can be activated by a cam connection.

An optical module of the elliptical type is known from patent application EP 2 006 605, comprising a source of light which is associated with a reflector and is closed by a dioptric element of the converging lens type, for example a lens of the plano-convex or Fresnel type. This module can be equipped with a fixed or mobile shield which can intercept at least partially, according to its position, the light beam which is emitted by the source of light/reflector assembly. The form of the upper edge of the shield makes it possible to delimit the cut-off required in the beam by imagery with the converging lens.

For further details concerning mobile shield modules, reference can be made in particular to patents EP1197387, which is equivalent to U.S. Pat. No. 6,623,149, EP1422471 or EP1442472. By command and by means of the presence of a motor, the mobile shield can assume different positions in relation to the source of light, at least one position of which is known as the optically "active" position, i.e., a position in which it actually cuts off part of the light beam, in particular so that the module emits a cut-off beam, such as a beam of the low type (oblique cut-off), or of the anti-fog type (horizontal cut-off). The shield can thus have one or a plurality of "active" positions, for example two, one for the low function for traffic on the right, and one for the function for traffic on the left, as well as a so-called "passive" function, in which it does not cut off the light beam, thus allowing the module to emit light beams without cut-off of the full-beam or high-beam type. For examples of fixed-shield modules, reference can be made in particular to patent FR2754039, which describes modules which can emit low or anti-fog beams, for example.

A headlight for production of different types of lighting is also known from U.S. Pat. No. 7,201,505.

SUMMARY OF THE INVENTION

The object of the invention is in particular to propose a new optical device which uses cut-offs in the manner of the aforementioned devices.

The object of the invention is thus an optical device, in particular a lighting and/or signaling device for a motor vehicle, which has an optical axis and comprises:

- a source of light;
- a reflector which is associated with the source of light in order to form a light beam;
- a rotary assembly which is designed to intercept the light beam, and can be rotated around an axis of rotation, between first and second distinctive lighting positions, this axis of rotation being in particular substantially perpendicular to the optical axis, this assembly comprising at least first and second shields associated respectively with the first and second lighting positions, in order to create a cut-off of the light beam, these shields each comprising at least one ridge, these ridges being in particular spaced from one another by a predetermined angular distance, this assembly additionally being designed to permit progressive transition of the lighting between the first and second distinctive lighting positions.

The present invention makes it possible in particular to obtain progressiveness in the change of the type of lighting, whilst obtaining discontinuity of the device from the mechanical point of view, i.e., the ridges of the shields, in order to produce cut-offs which are distinct and spaced from one another.

The invention makes it possible to obtain optical continuity between the beams of the first and second lighting positions.

In other words, the shields have mechanical discontinuity, i.e., these shields are in particular separated from one another by a hollow area, whilst, during the transition, making it possible to generate a beam which is continuous and progressive, in terms both of intensity, and in range and/or vertical displacement of the cut-off.

The rotary assembly according to the invention is in particular different from a drum without significant unevenness.

For example, by making the first shield pivot, corresponding for example to a low beam, the cut-off which is perceived in the beam increases gradually as far as the second lighting position, corresponding, for example, to an augmented-range beam such as a motorway beam, thus making it possible to obtain a gradual increase in the lighting on the ground, and in the range of the lighting.

As a result of the optical continuity between the beams of the first and second lighting positions, the transition between the two beams according to the invention can take place more slowly, which makes it possible to improve the driver's comfort.

In comparison, devices have been developed which are provided with only two lighting positions, i.e., low and high beam, wherein the transition between the low beam and the high beam is fast.

Slow transition means for example a transition between the low beam and the high beam which takes between 0.8 second and 3 seconds, whereas a fast transition between the low beam and the high beam takes between 50 milliseconds and 300 milliseconds, for example.

The time factor between a slow transition and a fast transition can thus be, for example, 2 or 3, or 10, or even more.

The need for a fast transition has been dictated by two constraints.

The first constraint is associated with the headlight function to attract attention in order to communicate quickly with another user.

The second constraint is associated with the cost, since a simple means for activating a shield consists of using an electromagnet, or a DC motor.

According to the present invention on the other hand, the shield assembly can fulfill a plurality of functions, for example, three or four functions or more, and it is advantageous to use a step-by-step motor in order to position each cut-off finely.

This type of motor also has the advantage of having adjustable speed and control, which makes it possible to change from one lighting position to another at different speeds, and thus to position a cut-off quickly or more slowly, as required.

Thus, by going from one position to another progressively, at a lower motor speed, the transition takes place gently, without affecting the driver, and the comfort is thus improved.

In addition, it should be noted that, with a fast transition speed, the optical defects can rarely be seen, whereas when slow transition is used, phenomena of uppering and lowering may occur more easily.

If required, between the low beam and the motorway beam, the rotary shield assembly can stop at least one, and preferably three intermediate positions between the low beam and the motorway beam.

If applicable, between the motorway beam and the high beam, the rotary shield assembly can stop at least one, and preferably two intermediate positions between the motorway beam and the high beam.

According to the invention, the angular distance between the two consecutive shields is selected such as, substantially, to avoid phenomena of uppering and lowering.

An uppering phenomenon may occur when one of the shields descends too far in comparison with the optical axis during the transition.

A lowering phenomenon may occur when, mechanically, one of the shields cuts off the optical axis excessively during the transition.

The invention makes it possible, for example, to avoid a jump in the lighting of the beam when transition from the first lighting position towards the second takes place.

Advantageously, the lighting intensity of the beam, measured at a point of the optical axis, varies monotonously, i.e., in a manner which increases or decreases between the first and second distinctive lighting positions.

According to one embodiment of the invention, the device comprises a lens which is disposed on the path of the light beam which has been intercepted by the rotary assembly.

If applicable, the axis of rotation of the rotary assembly can be on the focal plane of the lens.

The first distinctive lighting position can make it possible to generate a low beam.

If required, the second distinctive lighting position makes it possible to generate an augmented-range beam, for example, a motorway beam.

According to one embodiment of the invention, the rotary assembly is designed to be able to assume only two distinctive lighting positions.

As a variant, the rotary assembly is designed to be able to assume at least three distinctive lighting positions, which are selected, for example, from amongst: a low beam, an augmented range beam, a high beam, a selective beam, and a flat cut-off beam.

If required, these lighting positions can be adapted from a statutory point of view for traffic on the right or on the left in Europe, or for traffic in the United States.

The invention can permit transition to the augmented range beam mode, without activating a leveler. The position of the cut-off can be varied solely with the optical shield.

If applicable, the rotary assembly is designed to be able to assume exactly three, four or five distinctive lighting positions.

The angular distance between the first and second shields is for example between 10° and 60°, and in particular between 20° and 50°, and, for example, is close to 20° or 30°.

The first and second shields can each comprise one or a plurality of ridges. For example, these shields can each comprise two ridges. As a variant, one of the shields comprises a single ridge and the other shield comprises two ridges. These ridges are used to form a cut-off in the beam.

When the shield comprises two ridges, at least one of these ridges is preferable optically active during the progressive transition.

The ridges can each be formed on a rib of the rotary assembly, and in particular on a top of this rib.

At least one of the ridges of the shields can for example be formed as a ridge of a dihedron.

The ridge can correspond to a straight line, or it can be formed by a substantially rounded edge.

Optionally, the two shields can comprise a common ridge.

For example, the rotary assembly is designed such that, during the rotation from the first lighting position towards the second, firstly the first shield is optically active, then the second shield is active, such as to assure the progressive transition of the lighting.

According to one embodiment of the invention, the first shield comprises two ridges and the second shield also comprises two ridges, and, during the rotation from the first lighting position towards the second, firstly (first distinctive lighting position) the two ridges of the first shield are optically active, then (progressive transition) the second ridge of the first shield and the first ridge of the second shield are active, these ridges being adjacent, and finally (second distinctive lighting position) the two ridges of the second shield, and, if applicable, the bender are optically active.

According to one embodiment of the invention, the rotary assembly comprises at least one bender which is designed to reinforce the light intensity of a beam in at least one of the distinctive lighting positions, in particular in order to produce an augmented-range beam.

The second shield can comprise the bender and at least one ridge which is formed, for example, by an edge of this bender.

Preferably, the bender comprises a reflective surface, this surface being substantially flat, or, as a variant, it has a form which makes it possible to obtain a substantially oblique cut-off.

The bender can be designed to participate in the formation of an augmented-range beam, this augmented range being in particular greater than the range of a low beam.

Preferable, the bender is arranged such as to be optically active, at least temporarily, during the progressive transition, in order to maintain or increase the light intensity of the beam on the optical axis during this progressive transition.

According to one embodiment of the invention, during the progressive transition, the rotary assembly is designed to prevent the aforementioned lowering phenomenon.

The second shield, which corresponds for example to an augmented-range beam, can have a maximum height, measured from the axis of rotation, which is shorter than the maximum height of the first shield.

In this case, the axis of rotation of the rotary assembly can be on a focal plane of the device.

According to another embodiment of the invention, the axis of rotation is offset by a distance which is not zero (for example from 1 mm to several mm) relative to the focal plane.

In this case, the tops of the first and second shields optionally remain substantially below the optical axis, or are substantially tangent to this axis, during the progressive transition.

If required, the rotary assembly can comprise three shields, one of which is, for example, in order to produce a selective beam.

If required, the device according to the invention can be designed to permit progressive transition between the flat cut-off beam and the selective beam with cut-off in the form of an "L".

According to the present invention, "progressive transition" means in particular transition between two distinctive beams, which is accompanied by progressive displacement of a cut-off line, thus preventing, for example, a visible jump perceived by the driver in the cut-off line between the two beams.

The device can comprise a motor, in particular of the step-by-step type, which is designed to rotate the assembly.

According to one embodiment of the invention, the rotary assembly with shields is rotated by a rotary activation element, for example, this assembly with shields is integral with a wheel, in particular of the toothed type, which co-operates with a motor, and in particular with a pinion of the latter.

In particular, in the motor vehicle industry, there is a need to be able to light up the road in front of one's vehicle in "partial high-beam lighting mode", i.e., to be able to generate in a high beam one or a plurality of dark areas which correspond to the locations where there are vehicles present, coming from the opposite direction, or vehicles travelling in front, so as to avoid dazzling other drivers, whilst lighting the greatest possible surface area of the road. A function of this type is known as ADB (Adaptive Driving Beam).

Advantageously, the device according to the invention (in particular its shield assembly) is designed to produce in a lighting beam a dark area which is positioned substantially on a vehicle which is being followed or is passing by, in order to avoid dazzling the driver with the beam, this dark area being able to be displaced if necessary in order to follow the displacement of the vehicle which is being followed or is passing by.

For this purpose, according to the invention, the vehicle can be equipped with a camera which is placed at the front, and detects the presence of another vehicle, which for example is travelling in the opposite direction in the opposite lane (the left-hand lane), as well as its position (vertical and horizontal).

The angular orientation of at least one of the beams of the headlight is advantageously controlled by a DBL (Dynamic Bending Light) device, which in particular is coupled to this camera.

The headlight can, for example, be pivoted by means of a dedicated motor, which is advantageously distinct from the motor which makes it possible to activate the shield assembly.

These and other objects and advantages of the invention will be apparent from the following description, the accompanying drawings and the appended claims.

BRIEF DESCRIPTION OF THE ACCOMPANYING DRAWINGS

The invention will be able to be better understood by reading the following detailed description of non-limiting embodiments of it, and by examining the appended drawing, in which:

FIG. 1 represents, schematically and partially, in cross-section, a device according to an embodiment of the invention;

FIG. 25 illustrates schematically the development of the lighting and the position of the cut-off according to the angle of rotation of the rotary assembly according to the invention.

DETAILED DESCRIPTION OF THE PREFERRED EMBODIMENTS

Figure 4:
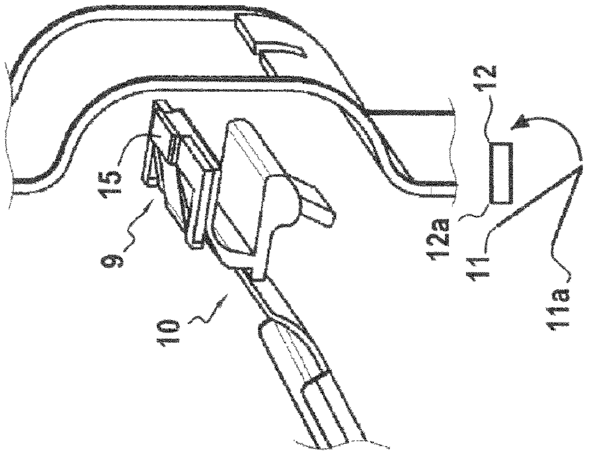
FIGS. 2 to 8 illustrate the mobile assembly of the device in FIG. 1, in different lighting positions.

FIG. 1 shows an optical device 1 formed by a headlight, in particular of the elliptical type, which comprises, disposed on an optical axis y-y:

- a reflector 2, in particular of the ellipsoidal type, which receives a source of light 3;
- fixed shields 4 and 5; and, for example of the filament or arc type. It may be a halogen lamp, a xenon la
- further towards the front, a converging lens 6.

The source of light 3 is of any appropriate type mp, or one or a plurality of light-emitting diodes.

The rays of light emitted by the source of light 3 are emitted in the direction of the lens 6, either directly or after being reflected on the reflector 2.

The rays then form a light beam.

The device 1 comprises a rotary assembly 10 which is designed to intercept the light beam, and can be rotated around an axis of rotation z, between first and second distinctive lighting positions, this axis of rotation being substantially perpendicular to the optical axis y-y.

This assembly 10 comprises this assembly comprising first and second shields 8 and 9, which are associated respectively with the first and second lighting positions in order to create a cut-off of the light beam, these shields being in particular spaced from one another with predetermined angular spacing (A), this assembly also being designed to permit progressive transition of the lighting between the first and second lighting positions.

Figure 2:
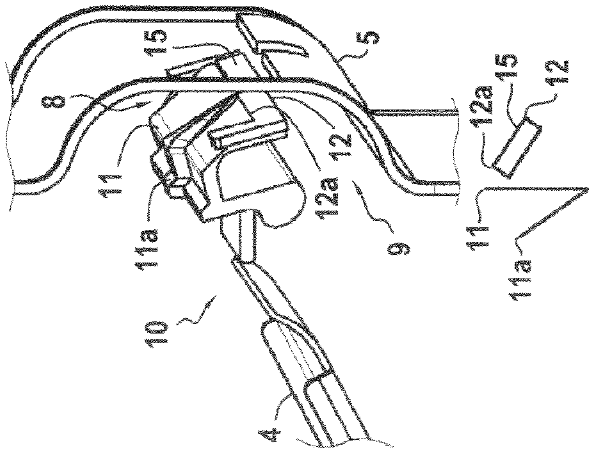

In the example described, the first distinctive lighting position (see FIG. 2) makes it possible to generate a low beam, and the second distinctive lighting position (see FIG. 4) makes it possible to generate an augmented-range beam.

Figure 3:
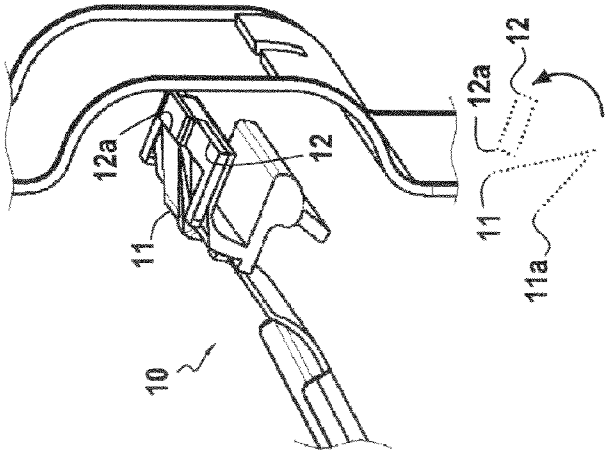

Between these two distinctive lighting positions, the rotation of the assembly 10 passes via a progressive transition phase (see FIG. 3).

In the example described, the rotary assembly 10 comprises a bender 15 which is designed to reinforce the light intensity in order to form the augmented-range beam.

The first shield 8 comprises two ridges 11 and 11*a*, which, in the example described, are each formed on a rib which extends substantially according to the axis z.

The ridges 11 and 11*a* have a height which varies according to the direction of the axis z, with a portion 14 which is inclined at the level of the middle of the ridge.

The second shield 9 comprises the bender 15 and two ridges 12 and 12*a* corresponding to two substantially straight edges, and is parallel to the axis z of the bender 15.

During the rotation from the first lighting position towards the second, firstly (first distinctive lighting position) the two ridges 11 and 11*a* of the first shield 8 are optically active, then (progressive transition), the second ridge 11 of the first shield 8 and the first ridge 12*a* of the second shield 9 are optically active, these ridges 11 and 12*a* being adjacent, and finally (second distinctive lighting position) the two ridges 12*a* and 12 of the second shield 9 and the bender 15 are optically active.

The bender 15 comprises a reflective surface, this surface being preferably substantially flat, or, as a variant, having a form which makes it possible to obtain a substantially oblique cut-off.

In the example described, the rotary assembly 10 also comprises a shield 16 in the form of an "L" in order to form a selective left-hand or right-hand beam.

Figure 6:
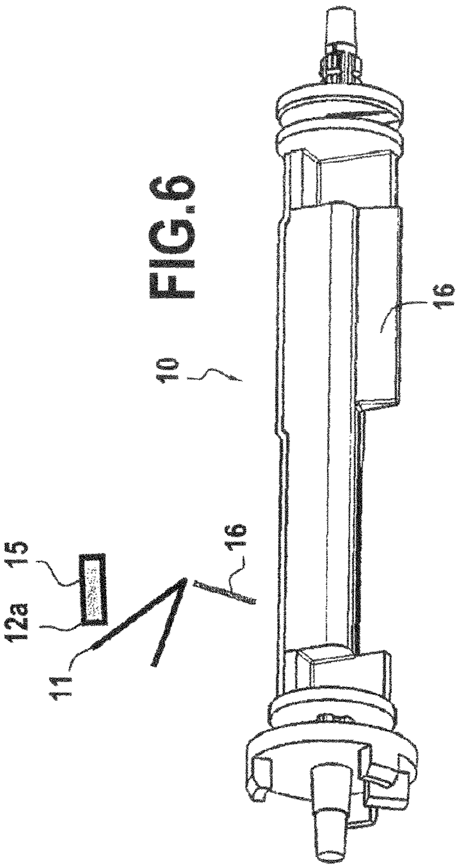
Figure 8:
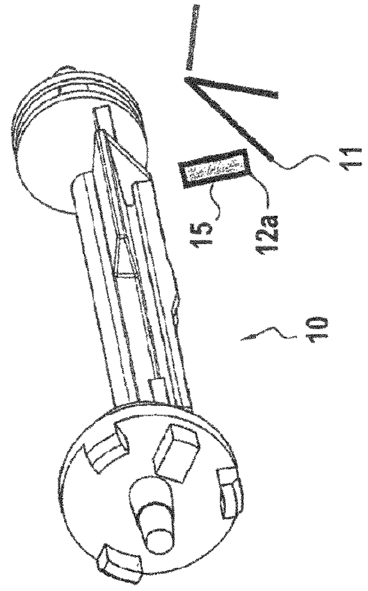
Figure 5:
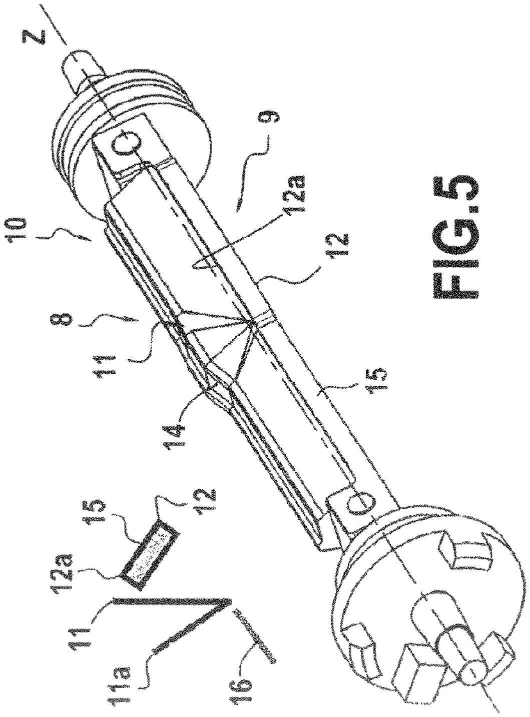
Figure 7:
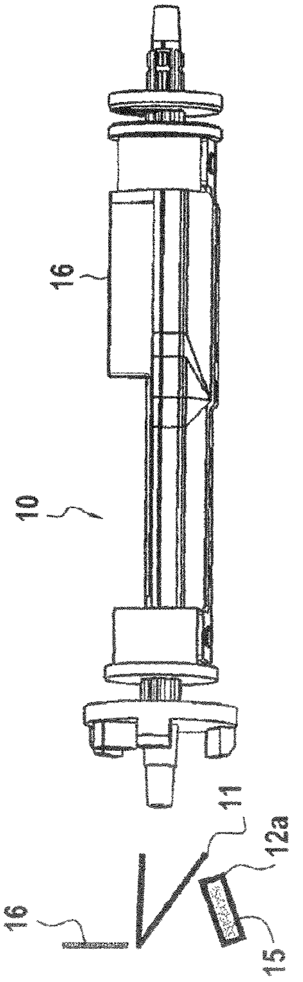

The rotary assembly 10 can assume four distinctive lighting positions in succession, i.e.:

low lighting (see FIG. 5);

augmented-range lighting, for example a motorway beam (see FIG. 6);

selective lighting (see FIG. 7);

high-beam lighting (see FIG. 8).

Figure 23:
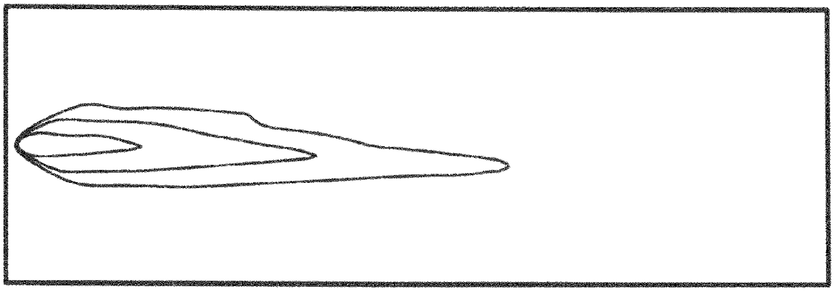

As can be seen in FIGS. 19 to 23 (which illustrate schematically lines of the same level of lighting on the ground), the beam produced by the device 1 according to the invention goes progressively (FIGS. 20 to 22) from the low beam (FIG. 19), to the augmented-range beam (FIG. 23). It can be seen that the range of the beam is augmented progressively during this progressive transition phase.

Figure 24:
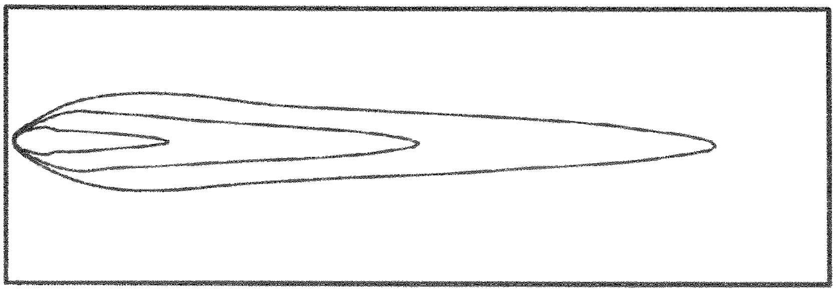

FIG. 24 illustrates lines of the same level of lighting on the ground for the high beam.

FIG. 25 illustrates, for the device 1, the development of the maximum lighting measured on a screen 25 m away in Lux (curve C1), and that of the relative position of the cut-off on a screen 25 m away (curve C2) according to the angle of rotation of the rotary assembly 10.

It can be noted that these curves have a relatively smooth increasing form, without any jumps.

Figure 9:
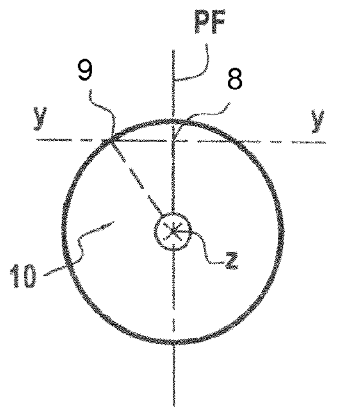
FIG. 9 is a diagram of a rotary assembly according to the state of the art.
Figure 10A:
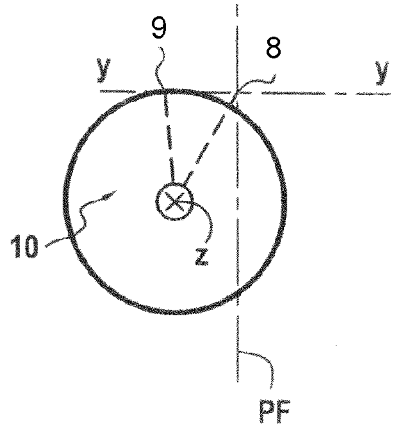
FIGS. 10A-10C are schematic partial views of rotary assemblies according to embodiments of the invention.

In another embodiment of the invention, as illustrated in FIG. 10A, the device 1 has a focal plane PF which is substantially perpendicular to the optical axis, and the axis of rotation z of the rotary assembly 10 is disposed as a distance which is not zero from the plane PF, such that, during the rotation from the first lighting position towards the second, the first and second shields 8 and 9 remain substantially below the optical axis, without intersecting the optical axis y-y or being tangent to this axis, in order to permit the progressive transition. In other words, these shields 8 and 9 never rise higher than the optical axis y-y.

other hand, if the axis of rotation z were on the focal plane PF (see FIG. 9), as known, the shield 8, for example, would intersect the axis y-y, which would create an undesirable lowering phenomenon.

Figure 10B:
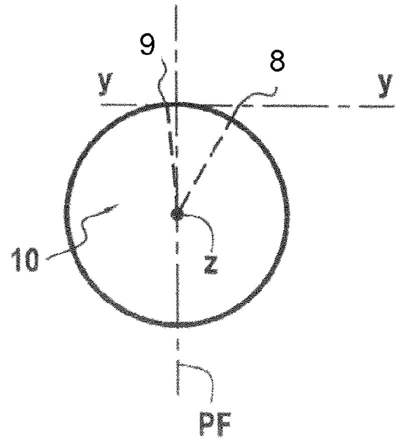

In the example in FIG. 10B, the second shield 9, corresponding to the augmented-range beam, can have a maximum height, measured from the axis of rotation, which is shorter than the maximum height of the first shield.

In this case, the axis of rotation z of the rotary assembly 10 can be on the focal plane PF of the device, whilst making it possible to avoid the lowering phenomenon.

Figure 10C:
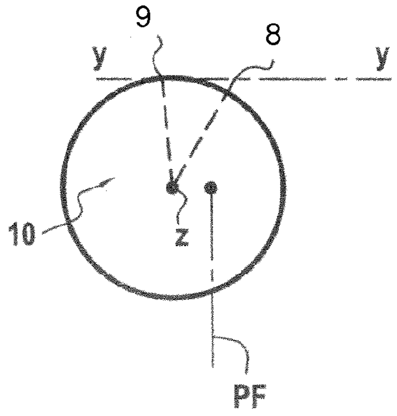
Figure 11:
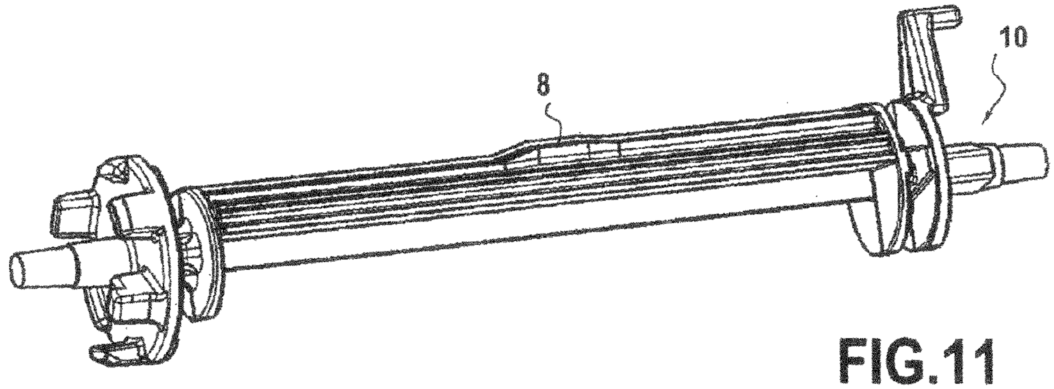
FIGS. 11 to 16 illustrate a mobile assembly of a device according to another embodiment of the invention.
Figure 12:
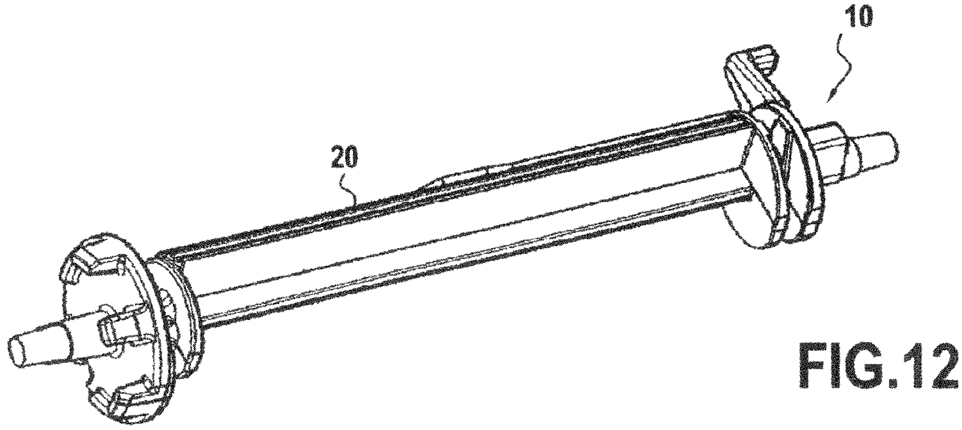
Figure 13:
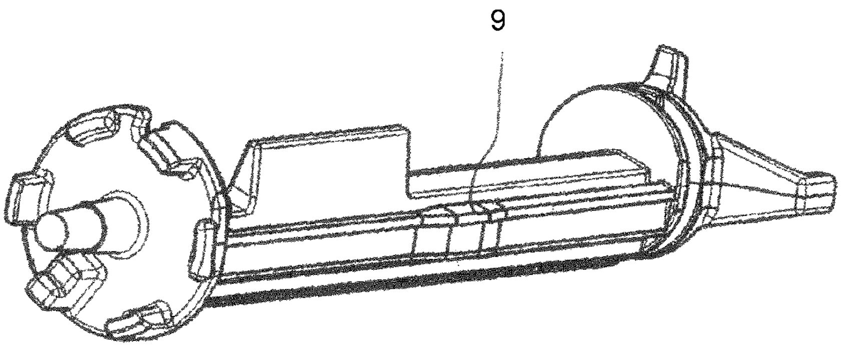

The example in FIG. 10C shows both the configuration of FIG. 10B as far as the height of the shields 8 and 9 is concerned, and the offsetting of the axis of rotation z relative to the focal plane PF.

Figure 14:
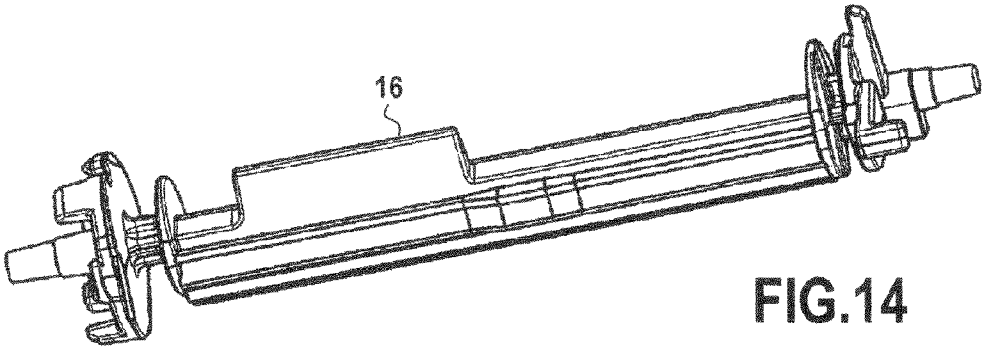
Figure 15:
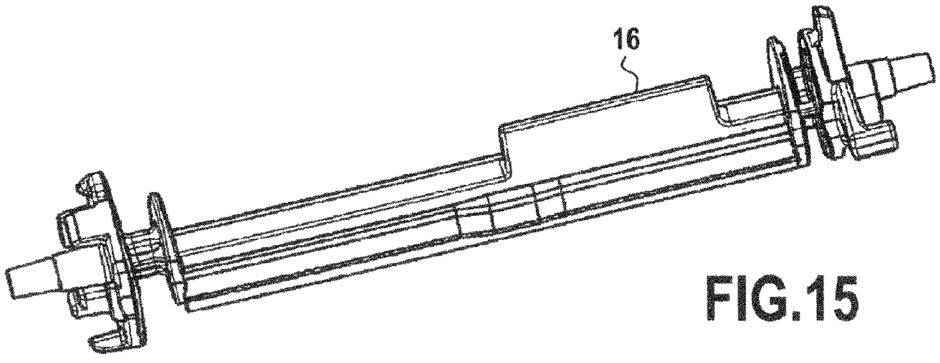
Figure 16:
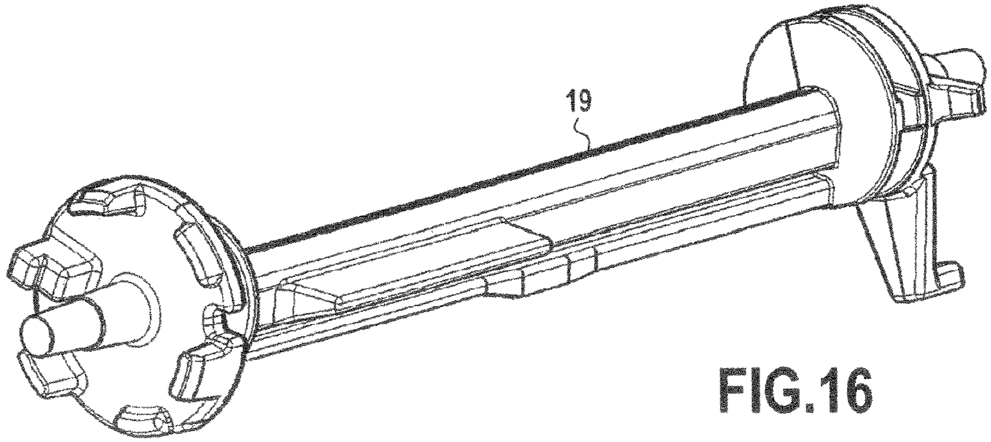

In the example in FIGS. 11 to 17, the rotary assembly 10 comprises in succession:

a shield 8 to produce the low beam;

a shield 9 to produce the augmented-range beam;

a shield 16 with a ridge in the form of an "L" in order to produce a selective beam (FIG. 14 shows the left-hand side and FIG. 15 shows the right-hand side), this selective beam corresponding substantially to a high beam with a dark area in the field of the vehicle which is being followed, or is passing by, or overtaking;

a shield 19 to produce a high beam; and a shield 20 to produce a flat cut-off beam.

Optionally, the rotary assembly 10 can be without a bender 15.

Figure 17:
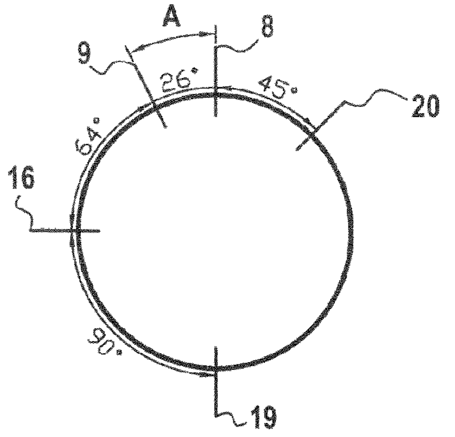
FIGS. 17 and 18 illustrate two types of positioning of the shields on the rotary assembly.

In the example in FIG. 17, the shield 19 of the high beam is disposed between the shields 16 and 20, and the angular distances between the shields are as follows:

45° between the shields 20 and 8;

26° between the shields 8 and 9;

64° between the shields 9 and 16;

90° between the shields 16 and 19.

Figure 18:
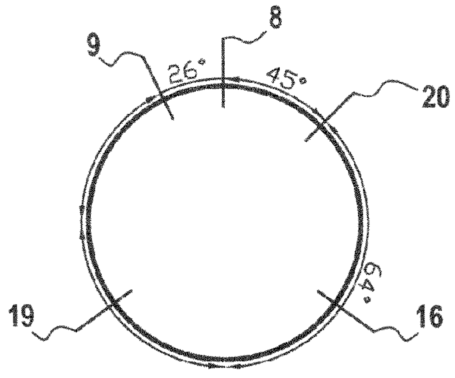
Figure 19:
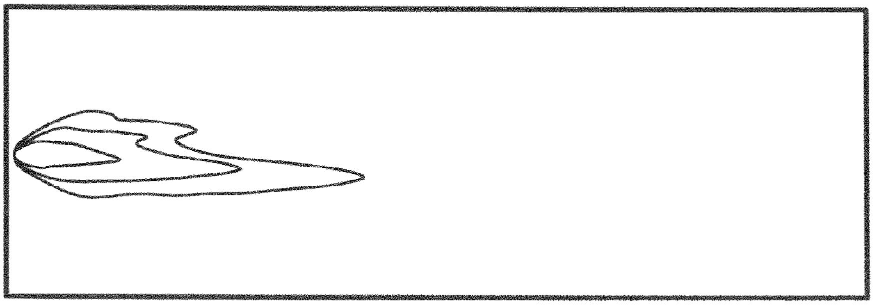
FIGS. 19 to 24 show schematically the different types of lighting obtained by means of the device in FIG. 1.
Figure 20:
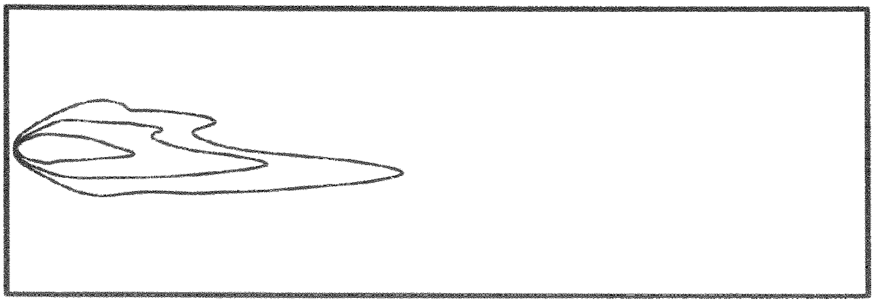
Figure 21:
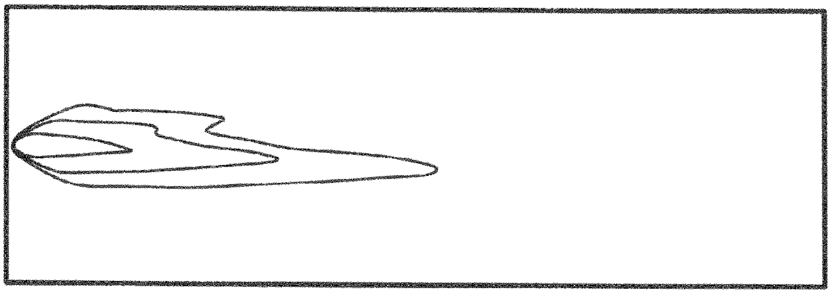
Figure 22:
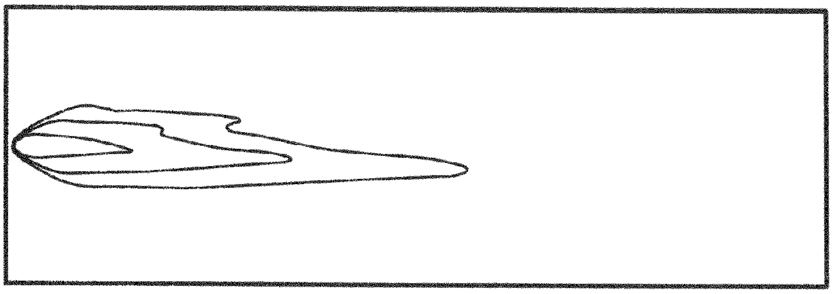

As a variant, in the example in FIG. 18, the shield 19 is disposed between the shields 9 and 16, and the angular distances between the shields are as follows:

45° between the shields 20 and 8;

26° between the shields 8 and 9;

64° between the shields 16 and 20.

It will be appreciated that the invention is not limited to the embodiments previously described.

For example, on the rotor assembly 10, the order of the shields can be different.

Also for example, if required, the assembly 10 can be designed to be able to be immobilized, by command from an electric motor, in an intermediate position between the distinctive lighting positions.

As a variant, the rotation of the assembly 10 is substantially continuous, by command from an electric motor, between the distinctive lighting positions.

The motor can for example be a DC motor, a step-by-step motor, or a piezo-electric motor.

The step-by-step motor can be advantageous for fine adjustment of the position of the rotary assembly between two distinctive positions.

The progressive transition can also be designed to be for example between a flat cut-off beam and a selective beam.

The invention can be applied both to traffic on the right and to traffic on the left, or if applicable for both.

FIGS. 26A to 26H illustrate the progressiveness between the different lighting positions according to the invention (on a screen 25 m away).

FIGS. 26A to 26E: transition from the low beam LB to the motorway beam MB via three intermediate low beams LB, progressions 1, 2 and 3.

Figure 26A:
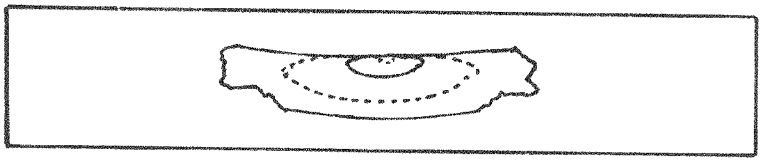
FIGS. 26A to 26H illustrate the progressiveness of transition between different lighting positions.
Figure 26B:
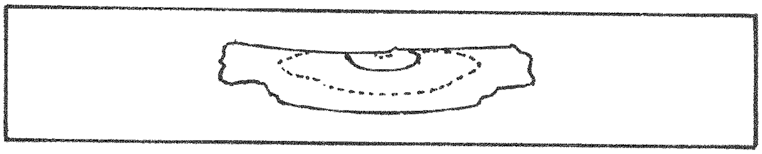
Figure 26C:
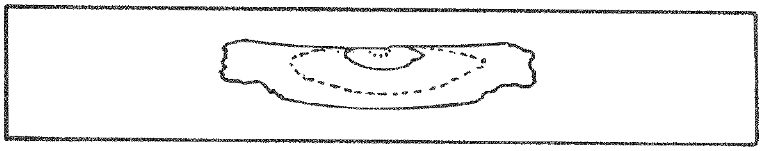
Figure 26D:
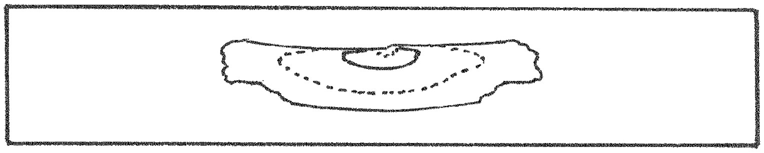
Figure 26E:
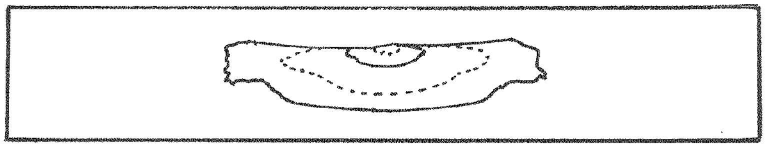
Figure 26F:
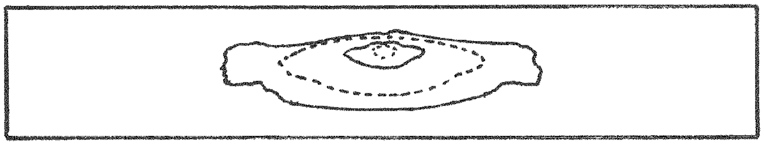
Figure 26G:
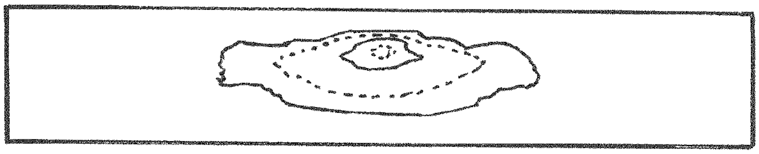
Figure 26H:
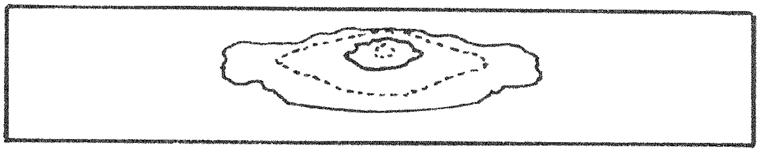

FIGS. 26F to 26H: transition from the motorway beam MB to the high beam HB via two intermediate high beams HB, progressions 1 and 2.

If required, the progressiveness can be designed for only one of the transitions.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An optical device, in particular a lighting and/or signaling device, for a motor vehicle, having an optical axis (y-y) and comprising:

a source of light;

a reflector which is associated with said source of light in order to form a light beam;

a rotary assembly which is designed to intercept said light beam, and can be rotated around an axis of rotation between a first lighting position and a second lighting position, said axis of rotation (z) being substantially perpendicular to the optical axis, said rotary assembly comprising at least a first shield and a second shield associated respectively with said first and second lighting positions, in order to create a cut-off of said light beam, said first and second shields each comprising at least one ridge, these ridges being in particular spaced from one another by a predetermined angular distance (A), said rotary assembly additionally being designed to permit progressive transition of the lighting between said first and second lighting positions; and a lens which is disposed on the path of said light beam which has been intercepted by said rotary assembly;

wherein said first shield comprises a first ridge and a second ridge and said second shield comprises a first ridge and a second ridge, and during the rotation from said first lighting position towards said second lighting position, firstly said first and second ridges of said first shield are optically active, then to provide said progressive transition, said second ridge of said first shield and said first ridge of said second shield are active, and finally said first and second ridge of said second shield are active.

2. The optical device according to claim 1, wherein said first and second shields have mechanical discontinuity, said first and second shields are in particular separated from one another by a hollow area, and generate, during said progressive transition, a beam which is continuous and progressive, in terms both of intensity, and in range and/or vertical displacement of said cut-off.

3. The optical device according to claim 1, wherein said first lighting position generates a low beam.

4. The optical device according to claim 1, wherein said second lighting position generates an augmented-range beam.

5. The optical device according to claim 1, wherein said rotary assembly comprises at least three shields in order to be able to assume at least three lighting positions selected from amongst: a low beam, an augmented- range beam, a high beam, a selective beam, and a flat cut-off beam.

6. The optical device according to claim 1, wherein said angular distance between said first and second shields is between 10° and 60°.

7. The optical device according to claim 1, wherein said rotary assembly comprises at least one bender which is designed to reinforce the light intensity of a beam in at least one of said lighting positions.

8. The optical device according to claim 1, wherein said optical device has a focal plane (PF) which is substantially perpendicular to said optical axis (y-y), wherein axis of rotation (z) is offset by a distance which is not zero relative to said focal plane (PF).

9. The optical device according to claim 1, wherein said second shield, which corresponds to an augmented-range beam, comprises a maximum height, measured from said axis of rotation, which is shorter than a maximum height of said first shield.

10. The optical device according to claim 1, wherein said optical device comprises a motor, in particular of the step-by-step type, which is designed to rotate the assembly.

11. The optical device according to claim 1, wherein a transition between a low beam and a high beam takes between 50 milliseconds and 300milliseconds.

12. The optical device according to claim 1, wherein the transition between a low beam and a high beam takes between 0.8 second and 3seconds.

13. The optical device according to claim 1, wherein between a low beam and a motorway beam, said rotary assembly can stop at least one, and preferably three intermediate positions between said low beam and said motorway beam.

14. The optical device according to claim 1, wherein between a motorway beam and a high beam, said rotary assembly can stop at least one, and preferably two intermediate positions between said motorway beam and said high beam.

15. The optical device according to claim 1, wherein said optical device is designed to produce in a lighting beam a dark area which is positioned substantially on a vehicle which is being followed or is passing by, in order to avoid dazzling a driver, said dark area being able to be displaced if necessary in order to follow the displacement of said vehicle which is being followed or is passing by.

16. The optical device according to claim 1, wherein said progressive transition is provided between a flat cut-off beam and a selective beam.

17. The optical device according to claim 2, wherein said first lighting position generates a low beam.

18. The optical device according to claim 2, wherein said second lighting position generates an augmented-range beam.

19. The optical device according to claim 2, wherein said rotary assembly comprises at least three shields in order to be able to assume at least three distinctive lighting positions selected from amongst: a low beam, an augmented- range beam, a high beam, a selective beam, and a flat cut-off beam.

20. The optical device according to claim 2, wherein said angular distance between said first and second shields is between 10° and 60°.

21. The optical device according to claim 3, wherein said rotary assembly comprises at least three shields in order to be able to assume at least three distinctive lighting positions selected from amongst: a low beam, an augmented- range beam, a high beam, a selective beam, and a flat cut-off beam.

22. The optical device according to claim 6, wherein said angular distance between said first and second shields is close to at least one of 20° or 30°.

23. The optical device according to claim 6, wherein said angular distance between said first and second shields is between 20° and 50°.

24. The optical device according to claim 1, wherein said rotary assembly comprises at least one bender which is designed to reinforce the light intensity of a beam in at least one of said lighting positions.

25. An optical device, in particular a lighting and/or signaling device, for a motor vehicle, having an optical axis (y-y) and comprising:

a source of light;

a reflector which is associated with said source of light in order to form a light beam;

a rotary assembly which is designed to intercept said light beam, and can be rotated around an axis of rotation between a first lighting position and a second lighting position, said axis of rotation (z) being substantially perpendicular to the optical axis, said rotary assembly comprising at least a first shield and a second shield associated respectively with said first and second lighting positions, in order to create a cut-off of said light beam, said first and second shields each comprising at least one ridge, these ridges being in particular spaced from one another by a predetermined angular distance (A) and both rotating simultaneously upon rotation of said rotary assembly, said rotary assembly additionally being designed to permit progressive transition of the lighting between said first and second lighting positions; and a lens which is disposed on the path of said light beam which has been intercepted by said rotary assembly;

wherein said second shield comprises a reflective surface that becomes increasingly optically active substantially simultaneously when an edge or ridge of said first shield is optically active when said rotary assembly is rotated from said first lighting position to said second lighting position, thereby generating said progressive transition.

* * * * *